INVENTOR,
WALTER P. SCHMITTER

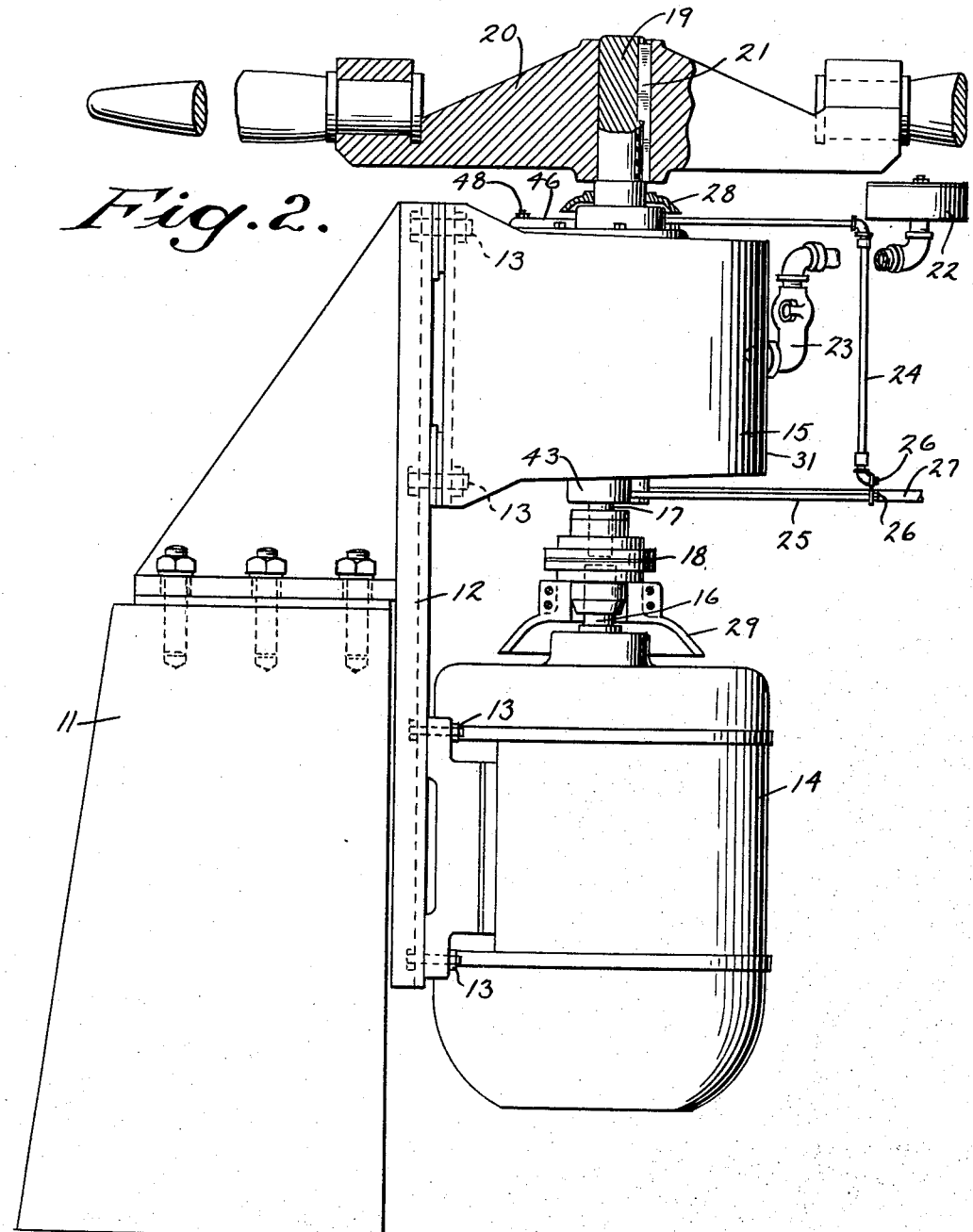

July 26, 1960  W. P. SCHMITTER  2,946,233
COOLING TOWER FAN DRIVE
Filed May 24, 1957  7 Sheets-Sheet 3
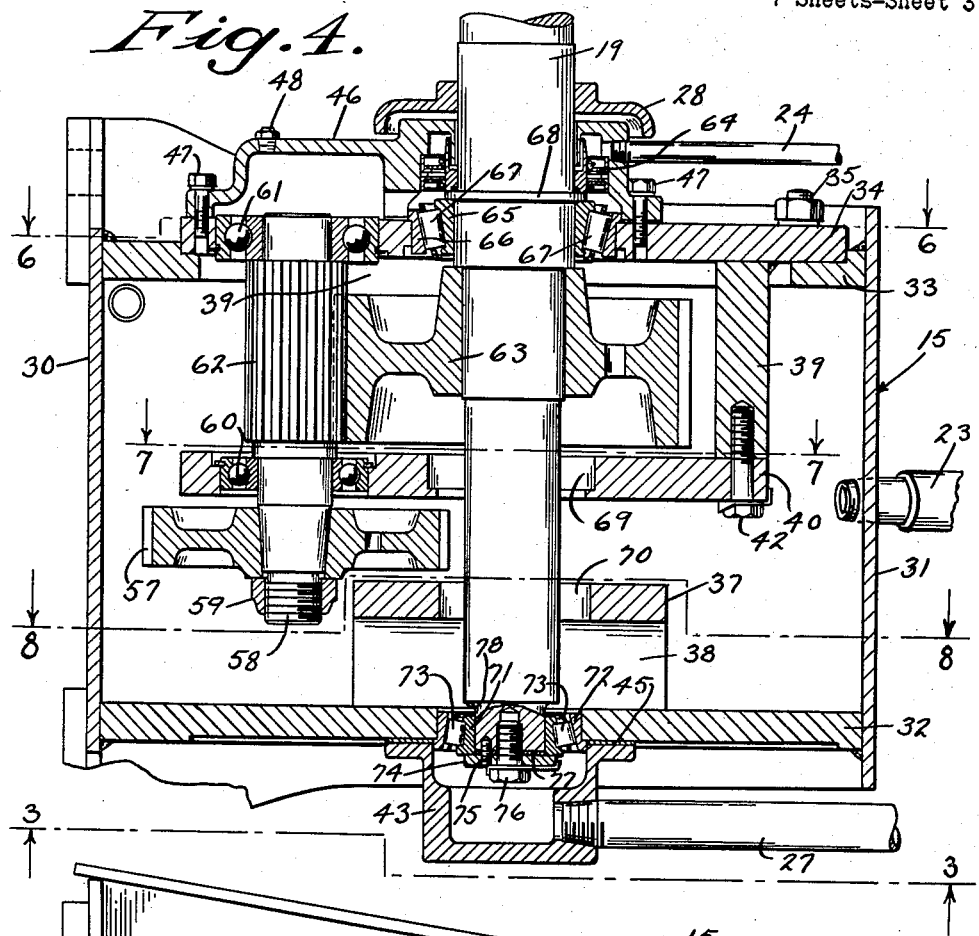
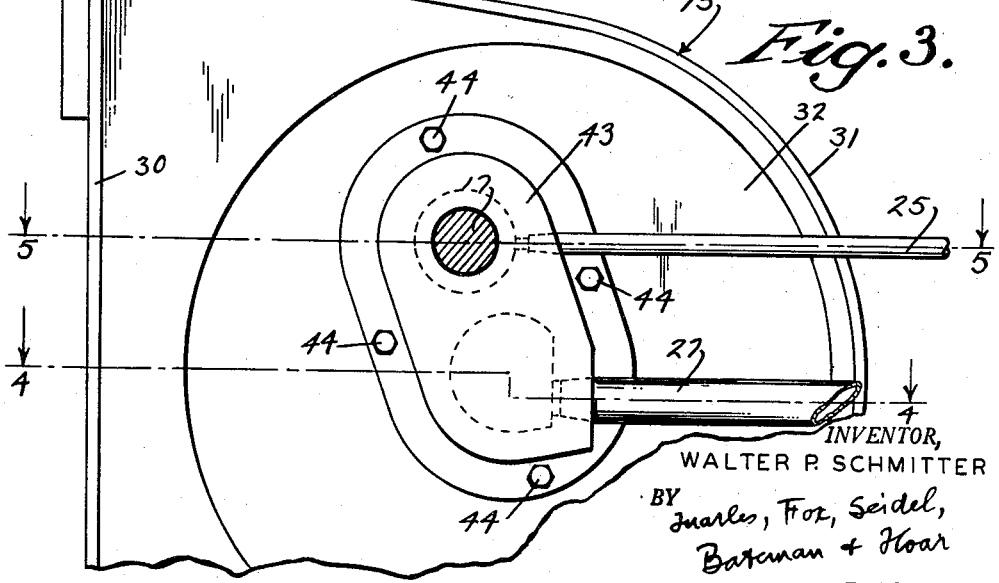
INVENTOR,
WALTER P. SCHMITTER
BY Juarles, Fox, Seidel,
Bateman & Hoar
ATTORNEYS

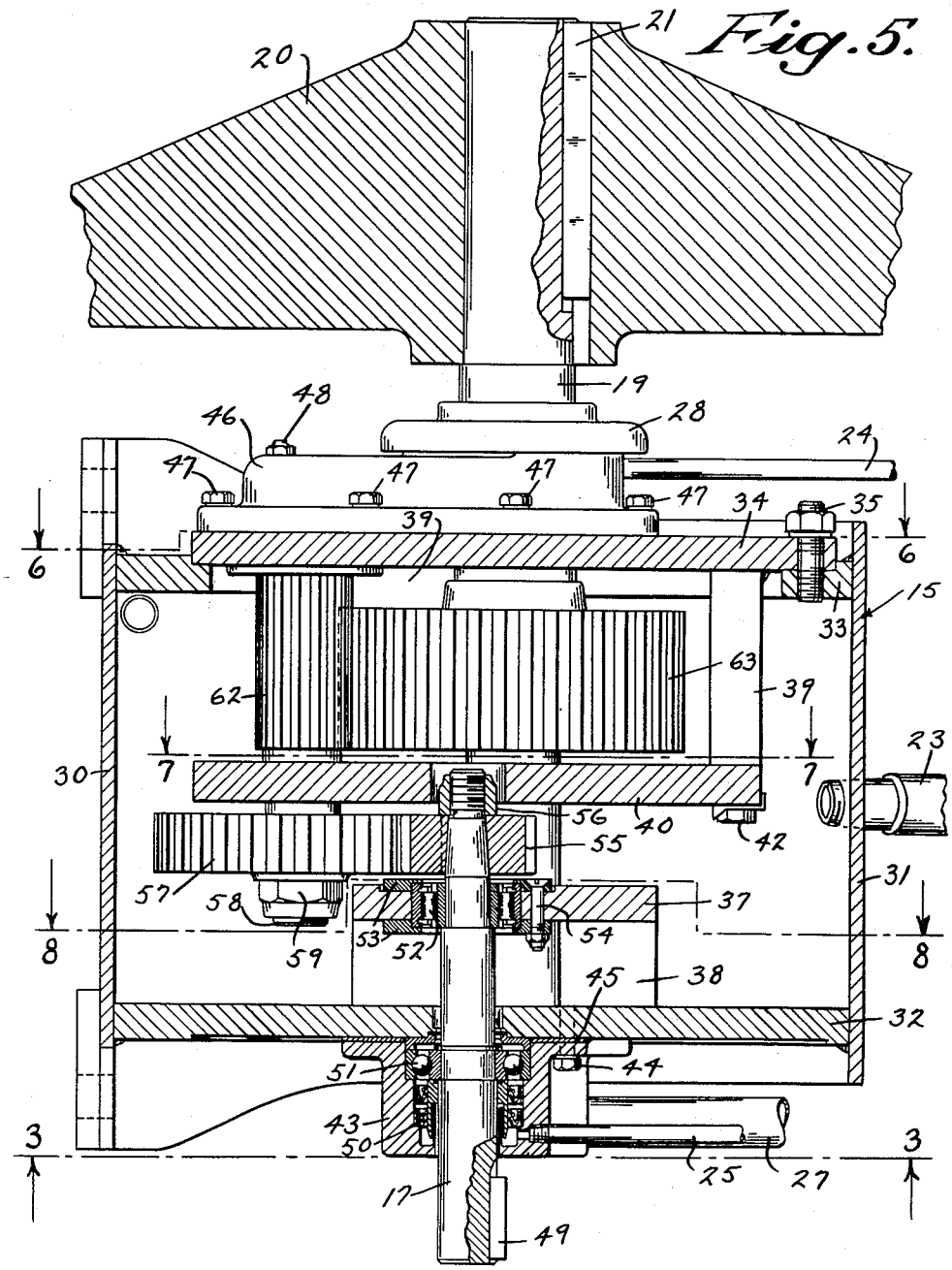

July 26, 1960 W. P. SCHMITTER 2,946,233
COOLING TOWER FAN DRIVE
Filed May 24, 1957 7 Sheets-Sheet 5

INVENTOR,
WALTER P. SCHMITTER
BY Juares, Fox, Seidel,
Bateman & Hoar
ATTORNEYS

July 26, 1960 W. P. SCHMITTER 2,946,233
COOLING TOWER FAN DRIVE
Filed May 24, 1957 7 Sheets-Sheet 6

INVENTOR,
WALTER P. SCHMITTER

BY Juarles, Fox, Seidel,
Bateman & Hoar
ATTORNEYS

July 26, 1960  W. P. SCHMITTER  2,946,233
COOLING TOWER FAN DRIVE

Filed May 24, 1957  7 Sheets-Sheet 7

INVENTOR,
WALTER P. SCHMITTER

BY Quarles, Fox, Seidel,
Bateman & Hoar
ATTORNEYS

United States Patent Office 2,946,233
Patented July 26, 1960

2,946,233

COOLING TOWER FAN DRIVE

Walter P. Schmitter, Wauwatosa, Wis., assignor to The Falk Corporation, Milwaukee, Wis., a corporation of Wisconsin Filed May 24, 1957, Ser. No. 661,328

1 Claim. (Cl. 74—421)

This invention relates to a speed-reducing geared-drive unit, designed primarily for supporting and driving the fan of the cooling tower of an air-conditioning or refrigerating system, and more particularly to such a fan mounted on a vertical shaft and imposing longitudinal and lateral loads on its shaft, although the invention may be used, with or without adaptation, on other more or less related heavy-duty installations.

The problems encountered in the design of speed-reducing geared-drive units for the above-mentioned primary purpose are in many respects unique. Fan speeds may range from about 150 to 550 r.p.m.; gear-reduction ratios from about 3:1 to 12:1; horsepower from about 5 to 100; and fan diameters from about 8' to 22'; and maximum fan-tip speed may rise to as much as 12,000 feet per minute.

Mounting the fan directly on the output shaft of the unit imposes on the fan-shaft bearings a tremendous downward thrust, due to gravity combined with the reaction against the thrust of the fan against the air. Of even greater severity are the radial loads imposed on the fan-shaft bearings by unbalance of the fan itself or of the aerodynamic forces acting on the fan. The resulting wear on these bearings, even though generously sized and sturdily built, cumulates with these causes themselves to produce shaft misalignment and faulty gear-tooth contact, which in turn produce abnormal wear of the tooth surfaces and may even involve actual breakage of one or more teeth of the output gear and the intermediate pinion with which it meshes.

Accordingly the principal object of the present invention is to provide a heavy-duty speed-reduction unit, adapted to meet the unique problems imposed by the primary use for which the present invention is designed.

More specifically the object is to provide such a unit having a greatly reduced tendency to misalignment and premature gear and bearing failure.

Other objects and advantages will appear in the description which follows.

This present invention is an improvement on the device of U. S. Patent No. 2,596,794, issued May 13, 1952, to the present inventor, for Speed Reducer, and is directed to rendering that device more suitable to the use for which the device of the present invention is primarily designed.

In the description, reference is made to the accompanying drawings, forming a part hereof, in which there are shown, by way of illustration and not of limitation, certain specific forms in which the article of manufacture of the present invention may be embodied.

In the drawings:

Fig. 2 is a side elevation of the same, as viewed from the left in Fig. 1.

Those two figures are to the same scale. All subsequent figures are to a more open scale.

Fig. 3 is a plan view of the drive unit of the present invention viewed from below, as from the line 3—3 of Figs. 4 and 5.

Fig. 4 is a vertical section of the same, as viewed from the line 4—4 of Fig. 3.

Fig. 5 is a vertical section of the same, as viewed from the line 5—5 of Fig. 3.

Figure 6:
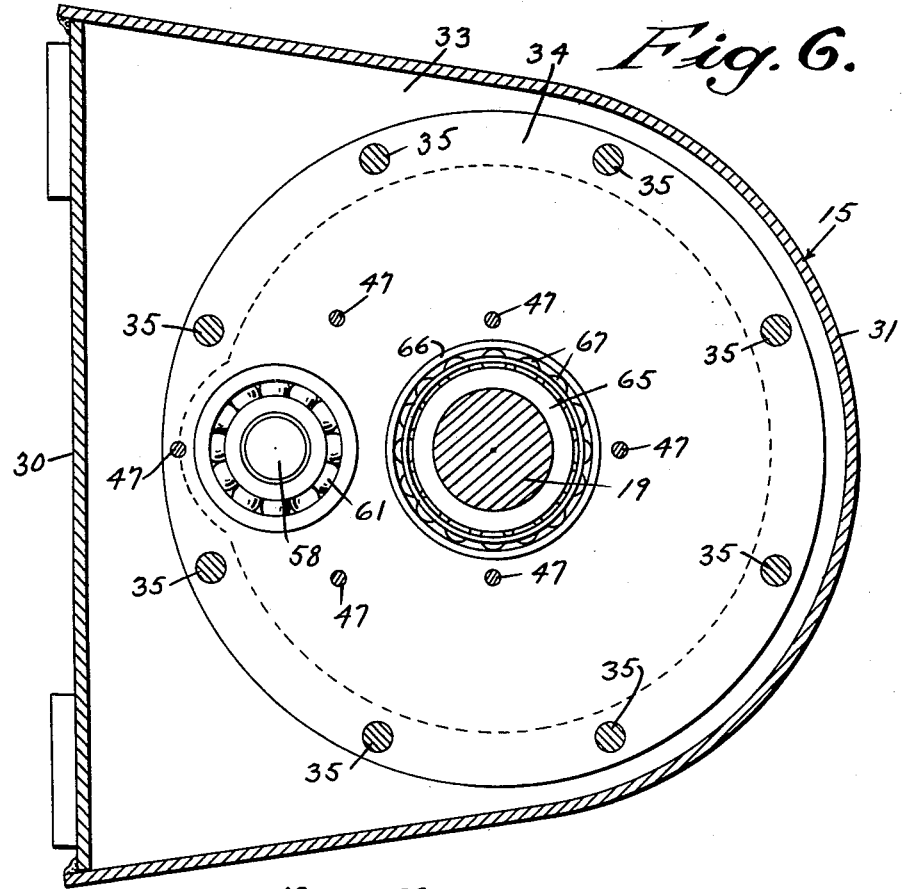

Fig. 6 is a horizontal section of the same, as viewed from the line 6—6 of Figs. 4 and 5.

Figure 7:
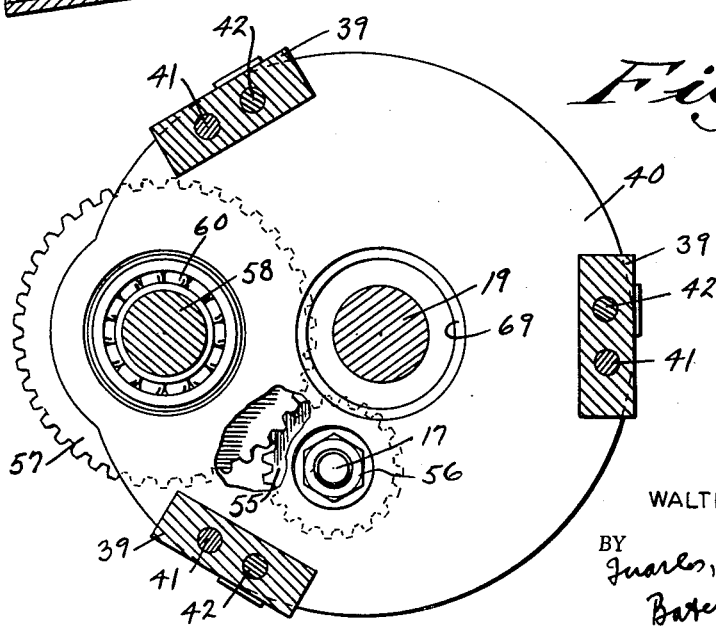

Fig. 7 is a horizontal partial section of the same, as viewed from the line 7—7 of Figs. 4 and 5.

Figure 8:
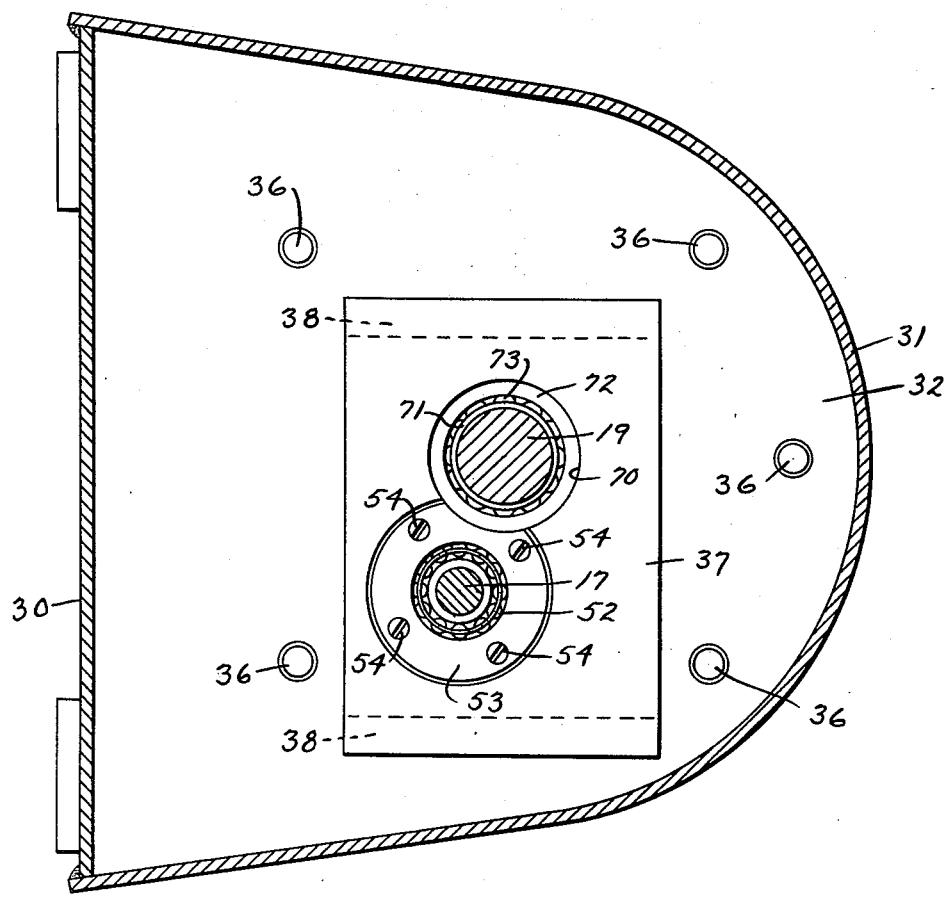

Fig. 8 is a horizontal section of the same, as viewed from the line 8—8 of Figs. 4 and 5.

Figure 9:
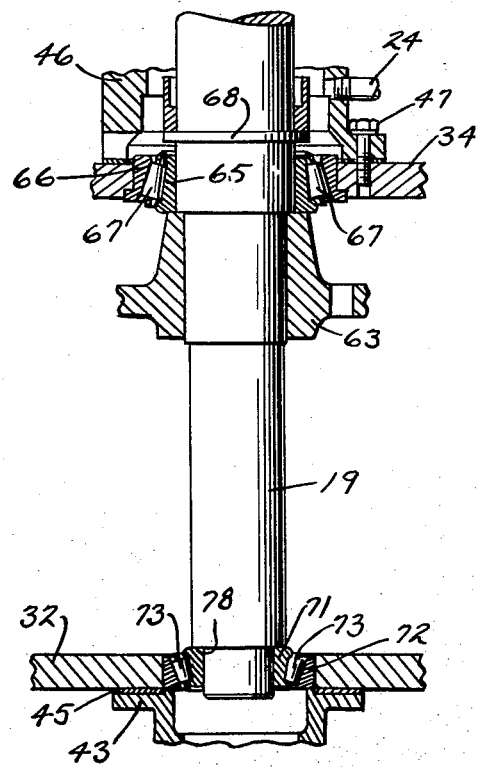

Fig. 9 is a partial vertical section, showing the output shaft and closely associated parts of a variant of the gear-reducer of the present invention. It corresponds to the central portion of Fig. 4.

Fans for cooling towers may be induced draft or direct draft, may have a vertical or a horizontal axis, and may impose a push thrust or a pull thrust on the shaft which supports them.

But inasmuch as the flow of air through such towers is almost universally upward, the following is the usual result. If the fan is direct draft, the fan will be at the side of the bottom of the tower, with its shaft horizontal, and with the motor and drive on the side of the fan away from the tower, and hence the fan will impose a push thrust on the fan-shaft. If the fan is induced draft, as is more usual, the fan will be above the top of the tower, with its shaft vertical, and with the motor and drive below the fan, and hence again the fan will impose a push thrust on the fan-shaft. Accordingly, in the following description we shall assume a fan on a vertical shaft, imposing a push thrust on its shaft, cumulating with the weight of the fan and its shaft and the gears on that shaft.

Departures from this primary description to adapt the invention to a horizontal output shaft and/or a fan which exerts a pull thrust on its shaft, will be suggested as the description progresses.

Throughout the description, the same reference numeral is applied to the same member or similar members.

Figure 1:
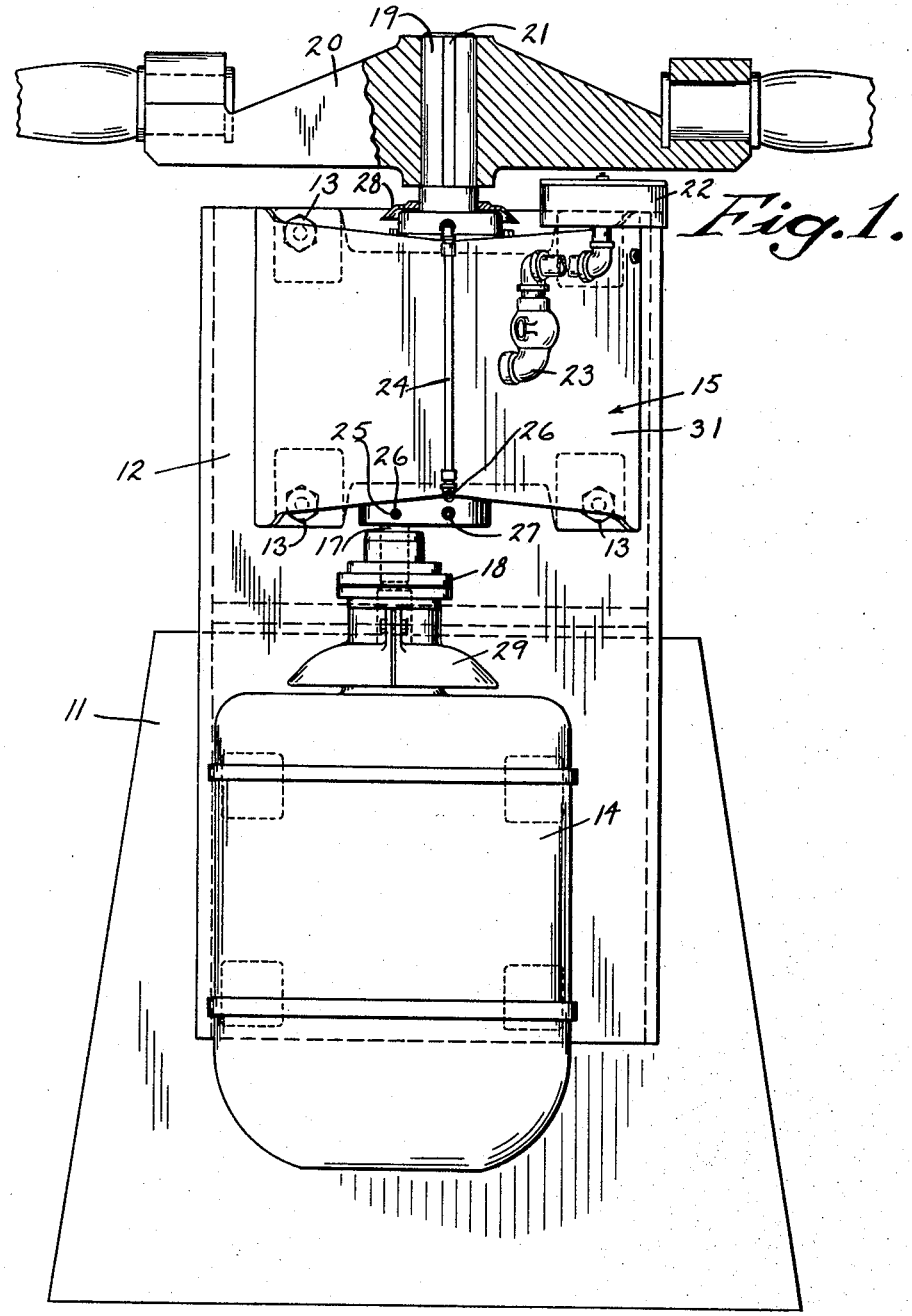
Fig. 1 is a front elevation of the complete installation of the present invention.

Referring now to the drawings, and more particularly to Figs. 1 and 2, it will be seen that 11 is a support, which may be of any convenient form. One part of said support may consist of a vertical mounting-plate 12, to which can be secured in any convenient manner, as by bolts 13, a high-speed prime-mover 14 (which may be an electric motor), and the drive-unit 15 the design of which constitutes the essence of the present invention.

The drive-shaft 16 of prime-mover 14 is connected to the input-shaft 17 of drive-unit 15 by means of a flexible coupling 18. Output-shaft 19 of prime-mover 14 is connected to fan 20 by means of spline 21.

A breather and expansion tank 22 is connected to drive-unit 15 by pipe 23. This breather also serves as an inlet for filling the unit with lubricating oil, and for that purpose is located above the top of the unit. When the unit is to be used horizontally, the oil level need not be maintained above the level of the bearings, and so the breather and its pipe may be supplanted by a mere plug, to close the hole. Oil may be admitted through this hole.

Pipes 24 and 25, closed by plugs 26, serve to admit grease under pressure to the outer of each pair of oil-seals, which will be located hereinafter. This grease keeps out dust and lubricates the outer seal. Pipe 27 serves to drain the oil from the unit.

Just above drive-unit 15, a slinger 28, secured to output-shaft 19, prevents water from entering the unit at the point of emergence of this shaft. A second slinger 29, secured to flexible coupling 18, prevents water and oildrippings from entering prime-mover 14 at the point of emergence of its drive-shaft 16.

Turning now to Figs. 3 to 8, and more particularly to Figs. 4 and 5, the details of drive-unit 15 will now be considered.

The housing of the drive-unit includes a back-plate 30, to which is welded a curved plate 31, constituting the front and side walls. There is a sturdy plate 32, welded to the back, front, and side walls, and constituting the input wall of the housing. At the opposite face of the housing, there is an apertured plate 33, welded to the back, front, and side walls of the housing. The aperture of this plate is closed by a removable head 34, secured to the apertured plate by bolts 35. Together the apertured plate and the removable head constitute the output wall of the housing.

There is a plate 37, which has two bent-over ends 38, by which it is secured by welding to the inner face of input wall 32, to form an integral part thereof. See Fig. 8.

Projecting inwardly from the inner face of housing head 34, and welded thereto, there are three lugs 39. These lugs support bearing-plate 40, which is accurately positioned by means of three dowel pins 41, and is secured to the lugs by means of three bolts 42.

An oilseal-retainer 43 is secured to the outer face of the input wall 32 of the housing, by means of bolts 44. See Fig. 3. This oilseal-retainer has two separate cavities, cross-sections of which are respectively shown in Figs. 4 and 5. There should be a gasket 45 between the oilseal-retainer and the face of the input wall. Gaskets may also be employed to seal other outside joints, especially if the unit is to be used horizontally.

Another oilseal-retainer 46 is secured to housing-head 34 by bolts 47, and has a vent-plug 48, to release the trapped air when filling the housing with oil.

Let us now trace the gear-train, with more particular reference to Fig. 5, beginning with input-shaft 17, which is keyed to flexible coupling 18 by means of spline 49.

Thence shaft 17 passes through an opening in oilseal-retainer 43, thence through a suitable pair of oilseals 50 and a suitable bearing 51, both in oilseal-retainer 43, an opening in the input wall of the housing, and a second suitable bearing 52. This second bearing is held by bent plate 37, to which it is shown attached by two small annular discs 53 and bolts 54.

On the end of input shaft 17 there is mounted input pinion 55, held thereon by nut 56. Bearing plate 40 is apertured to accommodate nut 56 and the end of shaft 17. Pinion 55 meshes with intermediate gear 57, which is secured to the end of intermediate shaft 58, by means of nut 59.

Turn now to Fig. 4. Intermediate shaft 58 is journaled in suitable bearings 60 and 61, mounted in bearing-plate 40 and housing-head 34 respectively. Between these two bearings this shaft carries, splined or otherwise secured thereon, intermediate pinion 62, which meshes with output gear 63, splined or otherwise secured to output shaft 19.

The number of intermediate gears, pinions, and shafts is not at all material to the present invention.

Output-shaft 19 passes through an opening in oil-seal-retainer 46, thence through a suitable pair of oilseals 64 carried by said oilseal-retainer, and thence through a thrust-bearing carried by removable head 34 of the housing.

This thrust-bearing comprises a cone 65, a cup 66, and conical rollers 67, and is oriented to take inward thrust on output-shaft 19. This orientation is an important feature, the reason for which will appear toward the end of this specification.

An annular projection 68 from shaft 19 bears downward on cone 65; and cup 66 bears downward on housing-head 34.

From the thrust-bearing, output-shaft 19 passes freely through an opening 69 in bearing-plate 40 and an opening 70 in bent plate 37, into a thrust-bearing which comprises a cone 71, a cup 72, and conical rollers 73, and is oriented oppositely than thrust-bearing 65—66—67 at the other end of shaft 19. This orientation is an important feature, the reason for which will appear toward the end of this specification.

Note that thrust-bearing 71—72—73, which is seen in Fig. 8 through opening 70 in bent-plate 37, is not (as appears from that drawing) actually in that opening. Compare Fig. 4.

An adjusting-plate 74, extending across the end of shaft 19, bears upward on cone 71; and cup 72 bears upward on wall 32. An adjusting-screw 76 extends freely axially through a hole in plate 74 into a threaded hole in shaft 19. A dowel 75 prevents plate 74 from rotating with respect to shaft 19.

Tightening screw 76 pushes plate 74 upward against cone 71, and pulls down on shaft 19. The push on cone 71 tightens its bearing. The pull on shaft 19 pulls on cone 65 of the bearing at the upper end of the shaft, thus tightening that bearing, too.

In initially assembling the unit, a thick shim or collection of shims 77 is selected just thin enough to permit free play of the two bearings. Then, as the upper bearing gradually wears due to the downward thrust of shaft 19, thinner and thinner shims can be substituted, so as to permit the tightening of screw 76 to take-up the resulting slack in the lower bearing. It will be noted that all this adjusting mechanism is readily accessible from outside the wall 32, by merely removing oilseal-retainer 32.

The construction, location, and accessibility of this adjusting mechanism are important features which will be again alluded-to near the end of this specification.

The just-described bearings supporting shaft 19, and the means and method of their adjustment, are predicated on the assumption that fan 20 imposes an inward thrust push on output-shaft 19. If, on the contrary, fan 20 imposes an outward thrust pull on shaft 19, these bearings and the means and method of their adjustment should be altered, as will now be explained with reference to Fig. 9, which shows the central part of Fig. 4 altered to suit the newly-supposed condition.

The thrust-bearings at the two ends of output-shaft 19 are now reversed from their orientations in Fig. 4. The upper bearing now takes the upward thrusts of shaft 19, and the lower bearing now takes downward thrusts of that shaft, instead of vice versa.

In the upper thrust-bearing, output gear 63 now bears upward on cone 65; and cup 66 now bears upward on housing-head 34.

In the lower thrust-bearing, there is now no adjusting-plate 74, nor adjusting screw 76, at the end of output-shaft 19. Shoulder 78 on shaft 19 now bears downward on cone 71; and cup 72 bears downward on oilseal-retainer 43.

Tightening screws 44 (see Fig. 3) pushes oilseal-retainer 43 against cup 72, thus not only tightening its bearing, but exerts an upward push on shaft 19 through cone 71. This upward push on shaft 19 pushes upward on cone 65 of the bearing at the upper end of the shaft, thus tightening that bearing, too.

In initially assembling the unit, gasket 45 acts as a shim, and is selected just thin enough to permit free play of the two bearings. Then, as the upper bearing gradually wears, due to the upward thrust of shaft 19, thinner and thinner gaskets can be substituted, so as to permit the tightening of screws 44 to take up the resulting slack in the lower bearing. It will be noted that, as in the case of the adjusting mechanism shown in Fig. 4, the adjusting mechanism of Fig. 9 is readily accessible from outside the wall 32.

The various inventive features of the present invention cooperate to produce the following desirable results:

(1) The journaling of the output end of the output shaft on the output wall of the housing, plus the journaling of the non-output end of said shaft on the opposite wall of the housing rather than on some interior projection from the housing, gives rigid and widely spaced support to said shaft.

(2) The journaling of the output end of the output shaft on the output wall of the housing, plus the journaling of the non-output end of said shaft on the opposite wall of the housing rather than outside and apart from said housing, gives as widely spaced support to said shaft as is consistent with not sacrificing the rigidity of the support of the non-output end of said shaft.

(3) Having said two bearings be thrust-bearings, positioned on two walls of the housing as above stated and oriented oppositely to each other, plus having adjustment means for the bearing on the non-output end of the output shaft be exposed through an opening in that wall of the housing on which this bearing is positioned, permits ready adjustment of this bearing, which adjustment can take-up the slack in both bearings, thus reducing the shaft-misalignment and axial looseness, which is due to bearing-wear.

(4) Regardless which bearing has the most wear, and regardless whether the unit is designed for use with a fan which pushes the air, or a fan which pulls the air, but provided that the orientation of the two thrust bearings is such that the bearing at the output end of the output-shaft takes the reaction of this push or pull, this reaction will keep that particular bearing always seated, thereby resisting side-thrust at this point where are located the output-gear and the intermediate pinion which meshes with it, and also preventing faulty tooth contact of these two gears.

(5) The adjustment means mentioned in paragraph numbered 3 above will differ depending whether the unit is designed for use with a fan which pushes the air, or a fan which pulls the air; and the details of each of these alternative means involves inventive structure and cooperation of parts.

All of the above features contribute to greatly reduce wear of the gear on the output shaft, and of the intermediate pinion which meshes with it, which wear is due to misalignment and axial vibration of said shaft and to faulty meshing of said gear with said pinion. This gear and this pinion are the chief location of tooth-wear and premature gear-failure in such a unit as is improved upon by the present invention.

It will be readily evident from the foregoing description that the present invention affords a novel and useful speed-reducing geared-drive unit, and especially such a unit for uses impose longitudinal and lateral loads on the output shaft of the unit.

Now that two embodiments of the invention have been shown and described, and several departures therefrom have been suggested, it is to be understood that the invention is not to be limited to the specific forms or arrangements of parts herein shown and described.

What is claimed is:

A heavy duty speed reduction unit, comprising: an output shaft; a tapered-roller bearing capable of taking radial as well as thrust loads, rotatably supporting the output end of the output shaft; a similar bearing, rotatably supporting the nonoutput end of the output shaft, and oriented oppositely to the first mentioned bearing; a gear on and drivingly keyed to the output shaft; a pinion drivingly meshing with the gear; means for rotating the pinion; means for adjusting to take up bearing free play and means imposing a predominant thrust in one direction on the output shaft; the unit being characterized by the fact that the bearing at the output end of the output shaft is oriented to take the predominant thrust, whereby that bearing is firmly seated with no free play, and whereby the bearing at the nonoutput end of the output shaft contains all the free play of the two bearings; the unit being further characterized by the fact that the gear is adjacent the bearing which is at the output end of the output shaft; the unit being still further characterized by the fact that the adjusting means is accessibly located at the bearing which is at the nonoutput end of the output shaft.

References Cited in the file of this patent

UNITED STATES PATENTS

| | | |
|---|---|---|
| 1,035,421 | Coppins | Aug. 13, 1912 |
| 1,045,517 | Conger | Nov. 26, 1912 |
| 1,231,218 | Swenson | June 26, 1917 |
| 1,894,927 | Schmitter | June 17, 1933 |
| 2,221,292 | Trout et al. | Nov. 12, 1940 |
| 2,293,200 | Foote | Aug. 18, 1942 |
| 2,327,962 | Drake | Aug. 24, 1943 |
| 2,441,446 | Schmitter | May 11, 1948 |
| 2,565,539 | Wildhaber | Aug. 28, 1951 |
| 2,596,794 | Schmitter | May 13, 1952 |
| 2,600,697 | Schmitter | June 17, 1952 |

FOREIGN PATENTS

| | | |
|---|---|---|
| 459,515 | Germany | May 4, 1928 |